United States Patent [19]

Jones et al.

[11] 3,927,027
[45] Dec. 16, 1975

[54] BIS(FURFURYL) IMIDE

[75] Inventors: Robert J. Jones, Hermosa Beach; Howard E. Green, Los Angeles, both of Calif.

[73] Assignee: TRW Inc., Redondo Beach, Calif.

[22] Filed: Oct. 31, 1973

[21] Appl. No.: 411,516

[52] U.S. Cl. ...... 260/326 S; 260/326 C; 260/326 N; 260/347.3
[51] Int. Cl.$^2$ .......................................... C07D 487/04
[58] Field of Search .......... 260/326 N, 326 S, 326 C

[56] References Cited
UNITED STATES PATENTS

| | | | |
|---|---|---|---|
| 3,312,715 | 4/1967 | Anderson | 260/326 C |
| 3,450,711 | 6/1969 | Megna | 260/326 C |
| 3,692,705 | 9/1972 | Newey | 260/326 C |
| 3,700,617 | 10/1972 | Golownia | 260/326 S |

FOREIGN PATENTS OR APPLICATIONS

| | | | |
|---|---|---|---|
| 911,221 | 11/1962 | United Kingdom | 260/326 N |

*Primary Examiner*—Nicholas S. Rizzo
*Assistant Examiner*—Mark L. Berch
*Attorney, Agent, or Firm*—Daniel T. Anderson; Alan D. Akers; Willie Krawitz

[57] ABSTRACT

A monomeric bis imide composition is produced by reacting furfuryl amine with an aromatic dianhydride or derivative thereof, the product having the structure:

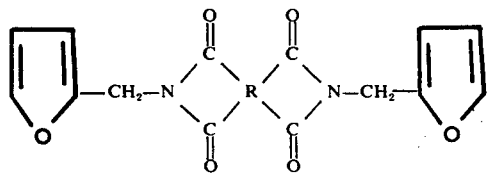

wherein R is a tetrafunctional aromatic radical. These imides can be used to prepare high performance linear polymers suitable for structural laminates or for crosslinking any polymer system which has pendant or internal unsaturation in the polymer backbone so that the imide can react by a Diels-Alder type reaction.

1 Claim, No Drawings

BIS(FURFURYL) IMIDE

BACKGROUND OF THE INVENTION

In the past, imides have been produced by the well-known reaction of ammonia with an anhydride. For example, when phthalic anhydride is heated with ammonia, phthalimide is formed. A similar reaction occurs with succinic anhydride to yield succinimide.

In addition, the reaction of diamines with dianhydrides to produce polyimides is well-known, as may be noted from U.S. Pat. No. 3,179,634, to Edwards. Although Edwards teaches polymeric compositions and not monomeric compositions, U.S. Pat. No. 3,528,950 to Lubowitz teaches a hybrid imide which falls between the monomer and the polymer. In Lubowitz, the polyimide chain is stopped by reacting with a reactive anhydride end-cap. This expedient produces an imide material which has the characteristics of both a monomer, in that a further reaction is required to produce the final polymer product, and a polymer, in that the imide prepolymer material is stable and can be used in solvent solutions for fabrication in manners similar to polymers.

SUMMARY OF THE INVENTION

The present invention relates to an end-capped imide monomer produced by the reaction of a dianhydride and a primary amine. The imide monomer which is formed has two reactive furfuryl groups which may be subsequently reacted by a Diels-Alder reaction, with any site having an olefinic unsaturation. Structure of the monomer may be illustrated as:

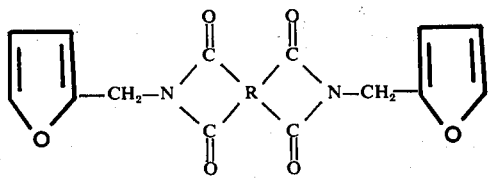

where R is a tetrafunctional aromatic radical. Thus, the end-capped monomeric imide may be used as a cross-linking agent where double bonds exist in the polymer backbone chain, or it may be used as a major constituent for a polymeric reaction with monomers having an olefinic end-cap, e.g. maleic or vinyl end-cap compounds.

DESCRIPTION OF THE PREFERRED EMBODIMENTS

Bis(furfuryl) imide is prepared by the reaction of one mole of an aromatic dianhydride with two moles of furfuryl amine. The compounds are reacted by refluxing in a solvent solution to produce the imide which precipitates from the solution upon cooling.

In order to produce the bis(furfuryl) imide of this invention, the use of furfuryl amine is required, however, a wide variety of aromatic dianhydrides may be used. Suitable dianhydrides may be represented by the following structure:

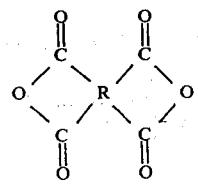

Wherein R is a tetrafunctional aromatic radical which may be selected from any of the following:

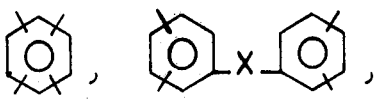

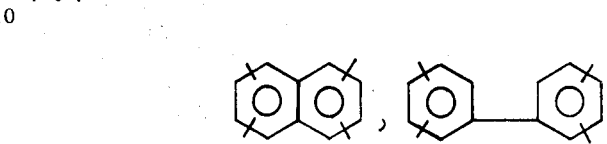

wherein X may be selected from any of:
—O—, —S—, —SO$_2$—, —CO—, —CH$_2$—, —C$_2$H$_6$—, or

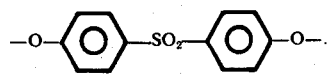

Bis(furfuryl) imides are prepared by dissolving furfuryl amine and an aromatic dianhydride in a solvent in a ratio of two moles of amine to one mole of dianhydride. The solution is then refluxed for a period up to 24 hours, depending upon the solvent used, to insure complete imidization. The reaction may be illustrated:

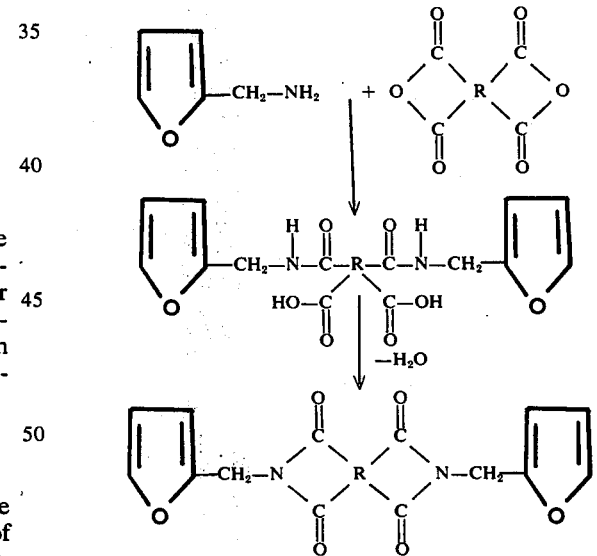

wherein R has been defined previously.

Although the selection of the solvent for the reaction medium is not critical, in general, the solvent should be substantially inert to aromatic dianhydrides and furfuryl amine. Any solvent which may be used for the azeotropic distillation of water is preferred. Thus, where a higher boiling solvent is used, the water is imidization produced by the reaction of the amine and the dianhydride is driven off more rapidly and the period of reaction is reduced accordingly. Examples of solvents suitable for the reaction medium are benzene, toluene, xylene, dimethylsulfoxide, N,N-dimethylformamide, pyridine, hexamethylphosphoramide, N,N-diethylacta-

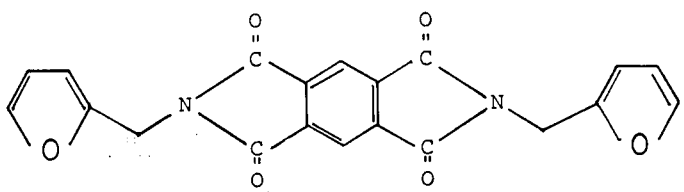

mide, and 1-methyl-2-pyrrolidine. So that the process of this invention may be better understood, the following examples teach the method and preparation of the bis imides according to this invention. It is to be understood that these examples are for the purpose of illustration and are representative of but a few of the many embodiments in combinations within the scope of this invention.

EXAMPLE I

Synthesis of Bis(2-furfuryl) Benzophenone Tetracarboxylic Imide

To a solution of 258 g (0.8 mole) of benzophenone tetracarboxylic anhydride in 600 ml of dimethylformamide was slowly added 150 g (1.6 mole) of furfurylamine. The mixture was stirred an additional twenty minutes after the amine was added and then 1000 ml of xylene was added. The mixture was refluxed for twelve hours during which time the water of imidization was removed with a Dean-Stark trap. The reaction mixture was allowed to cool and the resulting precipitate was collected by filtration. Recrystallization of the filter cake from xylene afforded 261 g (68%) of bis imide; mp 506–508°K (233°–235°C).

The bis imide prepared in this example is characterized by the following structure:

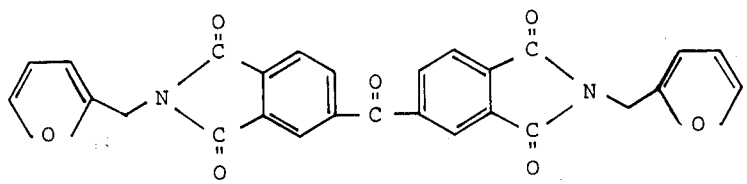

EXAMPLE II

Synthesis of Bis(2-furfuryl) Pyromellitimide

To a mixture of 87.2 g (0.4 moles) of pyromellitic dianhydride and 300 ml of dimethylformamide was added 77.6 g (0.8 moles) of furfurylamine dropwise over a thirty minute period. The mixture was stirred an additional twenty minutes and then 500 ml of xylene was added. The reaction mixture was heated to reflux and heating was continued for sixteen hours during which time the water from the imidization reaction was collected in a Dean-stark trap. The mixture was cooled to 273°K (0°C) and the resulting precipitate was collected by filtration. Recrystallization from acetone afforded 114 g (76%) of bis imide; mp 495°–497°K (222°–224°C).

The bisimide prepared in this example is characterized by the following structure:

EXAMPLE III

Difurfurylimide of Bis(3,4-dicarboxyphenoxyphenyl) Sulfone Dianhydride

To a 500 ml round bottomed flask, equipped with a magnetic stir bar, water bath and nitrogen inlet tube was added 16.28 g (0.03 mol) of bis(3,4-dicarboxyphenoxyphenyl) sulfone dianhydride in 65 ml of dimethylformamide. Stirring was begun and 5.83 g (0.06 mol) of furfuryl amine in 25 ml of dimethylformamide was added slowly for an additional funnel. The reaction mixture was stirred for two hours and then poured into a crystalizing dish. The dish was placed in a vacuum oven and the solvent and water of dehydration were removed by heating at 130°C for twelve hours under vacuum. The crude reaction product was recrystalized from xylene/hexane (50/50 v/v) to give 13.3 g (60% yield) of white crystals; mp 128°–130°C.

The bisimide prepared in this example is characterized by the following structure:

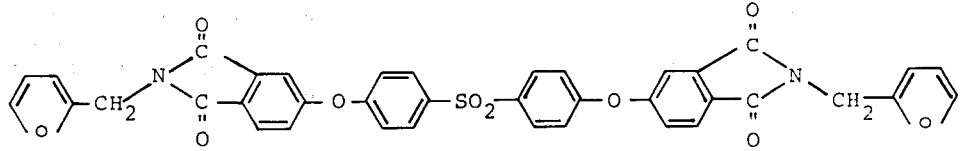

We claim:
1. A bis(furfuryl) imide having the structure:

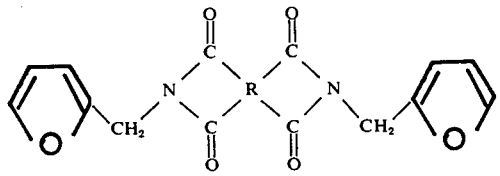

wherein R is a tetrafunctional radical selected from the group consisting of

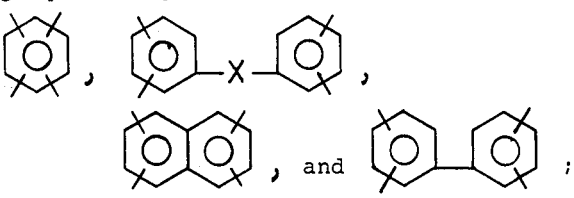

wherein X is —O—, —S—, —SO₂—, —CO—, —CH₂—, —C₂H₄—, —C₃H₆—, and

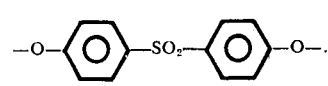

* * * * *